United States Patent [19]

Granum

[11] 4,079,838
[45] Mar. 21, 1978

[54] INSTRUMENT MOUNTING PANEL

[76] Inventor: Victor Konrad Granum, Solasvn 11, Oslo 6, Norway

[21] Appl. No.: 736,504

[22] Filed: Oct. 28, 1976

[30] Foreign Application Priority Data

Nov. 10, 1975  Norway ............................. 753746

[51] Int. Cl.² ............................................. A47F 7/00
[52] U.S. Cl. ...................................... 211/26; 52/98; 220/266; 248/DIG. 9
[58] Field of Search ............ 211/26; 248/DIG. 9, 248/27.1; 220/266; 174/65, 66; 52/98–100

[56] References Cited

U.S. PATENT DOCUMENTS

| | | | |
|---|---|---|---|
| 1,608,621 | 11/1928 | Sachs | 220/266 |
| 1,840,494 | 1/1932 | Eshbaugh | 248/27.1 |
| 1,841,212 | 1/1932 | Sachs | 220/266 X |
| 1,850,165 | 3/1932 | Barnett | 220/266 |
| 2,889,016 | 6/1959 | Warren | 52/98 |
| 3,284,971 | 11/1966 | Attwood | 52/100 |
| 3,748,007 | 7/1973 | Mathias | 52/98 X |

FOREIGN PATENT DOCUMENTS

| | | | |
|---|---|---|---|
| 466,689 | 7/1950 | Canada | 248/DIG. 9 |
| 68,243 | 8/1944 | Norway. | |

*Primary Examiner*—Roy D. Frazier
*Assistant Examiner*—Terrell P. Lewis
*Attorney, Agent, or Firm*—Finnegan, Henderson, Farabow & Garrett

[57] ABSTRACT

A mounting panel for technical instruments consisting of a number of smaller panel elements which are provided with instrument holes and which form a system of modules. The panel is provided with weakenings so that elements of the panel may be broken away for adapting the panel to the desired size. Weakenings are also provided in the panel which run between adjacent holes so that the middle portion between four or more of the holes may be knocked out to obtain a larger opening to fit larger instruments.

4 Claims, 2 Drawing Figures

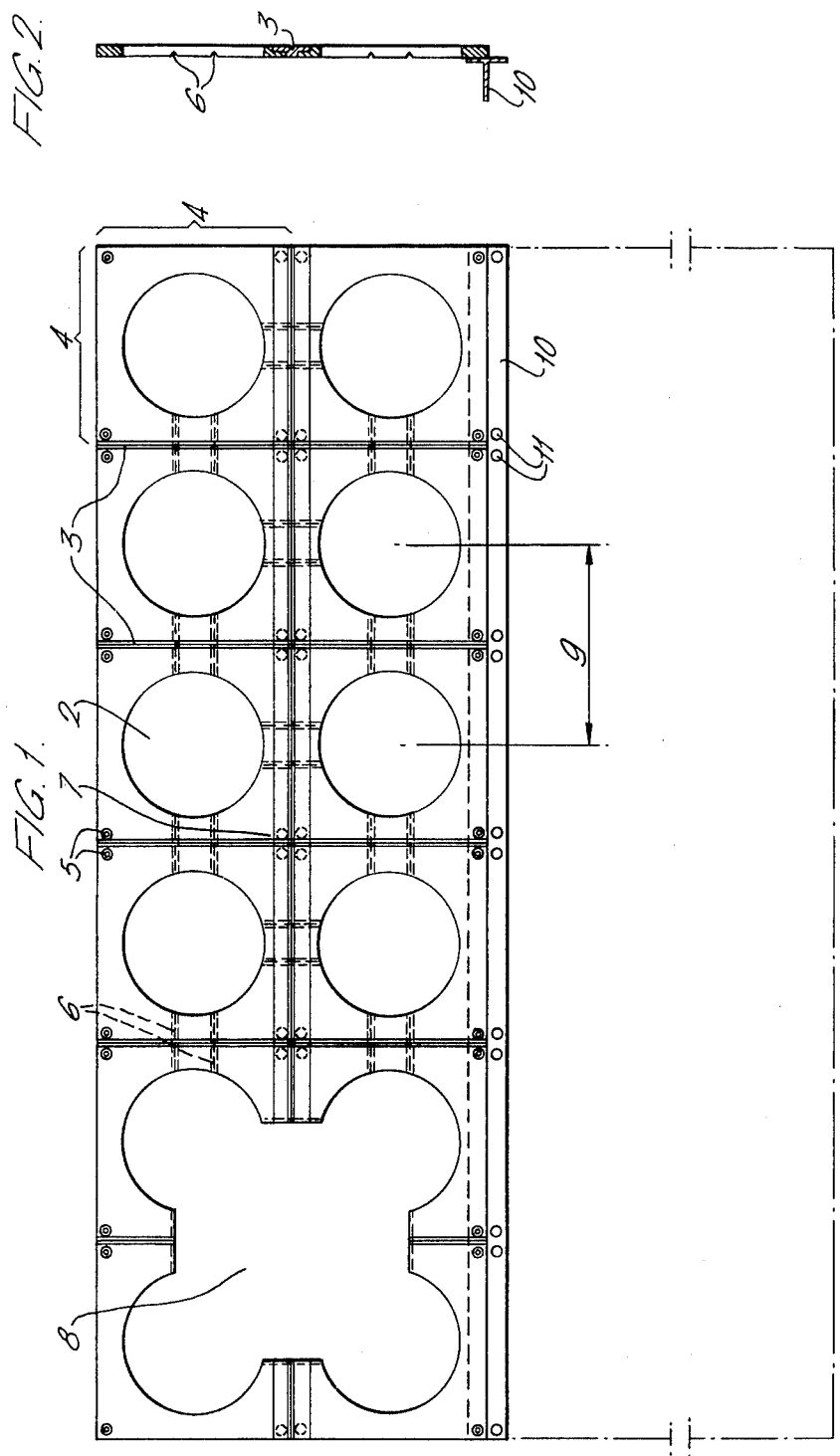

INSTRUMENT MOUNTING PANEL

The present invention concerns a mounting panel for technical instruments, consisting of a number of smaller panel elements which are provided with holes in which to fit instruments, the panel elements forming a module system. The mounting panel is particularly suitable for technical instruments which are made to be recessed in a panel.

Up to now, it has been common practice to special-construct mounting panels for each particular case, and the size of the panel as well as the number and size of the holes for the instruments could not be decided before the number and type of instruments to be used were determined for each particular case.

Cutting out openings in walls, apparatus panels, instrument racks and the like is usually time-comsuming and often requires special tools for the different sizes of instruments to be mounted.

Various kinds of mounting panels which lessen these problems to a degree are known. Such panels are constructed of prefabricated elements, each element having the necessary holes for various instruments and operating controls. The elements can be built together into larger panels by means of special frames or the like.

It is further known to make elements in different sizes, where the larger elements have a side dimension which is a multiple of the side dimension of the smallest element, such that large and small panel elements can be built together in arbitrary order.

The disadvantages of these panels, however, are that a range of different elements must be carried in stock, and that mounting the elements together in the frame can be time-consuming. This makes for a relatively expensive mounting panel. Furthermore, the frame constructions often require more space than one has available, and do not always have an attractive appearance, which is desirable for certain purposes.

The object of the present invention is to provide an instrument mounting panel in which the above disadvantages are eliminated, and this is achieved by means of the characterizing features disclosed in the main claim.

This mounting panel is differentiated from the mounting panels known previously in that it can be adapted to the desired size by means of weakenings arranged on the panel material. One or several panel elements can be broken away from the mounting panel along the weakenings, which form a boundary between each panel element and its adjacent elements.

The instrument mounting panel, as mentioned introductorily, comes equipped with holes which are designed to fit the smallest of the relevant instrument sizes which can be mounted on the panel. The mounting panel is differentiated from previously known panels in that the middle portion between four or more of the instrument holes can be knocked out along further weakenings in the panel material which run between adjacent holes, such that one thereby obtains a larger opening to fit larger instruments. The weakenings are arranged such that both large and small instruments can be mounted arbitrarily on the same mounting panel, while at the same time a harmonious and attractive appearance is obtained because all of the instruments are spaced equidistant, which is more fully explained in the following description.

The characterizing features of the invention will be further elucidated by the claims and the following description, wherein an example of an embodiment of the invention is described with reference to the drawings, where FIG. 1 shows an instrument mounting panel according to the invention seen head-on, and FIG. 2 depicts a cross section through the mounting panel.

FIG. 1 shows an instrument mounting panel 1 provided with holes 2 which, using simple hand tools, can be made to fit different numbers and sizes of instruments, and particularly instruments having an approximately square front plate in two or more sizes, where the lateral dimension of the front plate on the larger instruments is a multiple of the lateral dimension on the front plate of the smallest instrument.

The instrument mounting panel 1 can be prefabricated in appropriate standard sizes, for example, where each standard size corresponds to the largest size that is common within a specific area of application. The mounting panel 1 is provided with weakenings 3 which divide the plate into panel elements 4 which form a system of modules for the mounting panel 1, and each of the panel elements 4 is provided with said holes 2. The weakenings 3 make it possible easily to break away a portion of panel having the desired number of instrument holes 2 from the original standard-size panel in order to obtain a panel for the desired number of instruments.

Each panel element 4, which is provided with said holes 2 and which is bounded by weakenings 3, is provided with fastener holes 5 or with weakenings for knocking out fastener holes 5 in each corner. This means that no matter what size section of the mounting panel is broken away, there will be fastener holes 5 in the corners and along the outer edges of the panel section.

Between all instrument holes 2, weakenings 6 are arranged which are placed such that they mutually correspond to the size of that part of a possible larger instrument which is to be recessed in the panel. These weakenings 6 make it possible to remove with simple hand tools a middle portion 7 between four adjacent panel elements 4 and thereby provide an instrument hole 8 which is suitable for mounting a larger instrument.

The instrument mounting panel 1 thus described, consisting of panel elements 4 which can be broken away, makes possible the varied placement of both large and small instruments in any order, in that number which in each case is desirable, and the fitting of the instruments into the panel can be done by hand or with ordinary tools.

If there are instrument holes 2 in the mounting panel 1 which are not used for instruments, these can be closed off in a manner known per se by means of a blind cover. The blind cover can be used, for example, for mounting warning lights, breakers or similar components, and can also be provided with the name of the company or some other appropriate text.

The module system of the mounting panel 1 is designed such that several panels 1 can be mounted beside one another or above one another and thereby give the same distance 9 between all instrument holes 2 in a group of panels 1.

The module system therefore makes possible the mounting of instruments of different sizes in a group where all of the instruments are spaced equidistant.

When several mounting panels 1 are to be built together into larger groups, special rod profiles 10 are used between each mounting panel 1 as well as along the outer edges of the group of panels. The rod profiles 10 can have a known per se T-shape, and the mounting panel 1 is fastened in a known manner to the lateral flange of the rod profile 10 by means of screws or nails through the fastener holes 5 of the panel element 4 and the fastener hole 11 in the lateral flange of the rod profile 10.

Having described my invention, I claim:

1. An instrument mounting panel for technical instruments comprising:
    (a) a series of smaller panel elements formed in a two-dimensional array, each of said smaller panel elements having an instrument hole therethrough for defining a system of modules; and
    (b) weakenings formed in said mounting panel for breaking away selected portions of said mounting panel, said weakenings including weakenings extending between said instrument holes of adjacent smaller panel elements in both dimensions of said array and wherein at least one portion is formed by said weakenings between the instrument holes of adjacent smaller panel elements in both dimensions of said array for providing a breakout for a larger hole.

2. The instrument mounting panel for technical instruments as set forth in claim 1 wherein said weakenings extending between said instrument holes of adjacent smaller panel elements comprise a pair of straight extending score lines.

3. The instrument mounting panel for technical instruments as set forth in claim 1 wherein said weakenings further include annular weakenings at the corner of each of said same smaller panel elements for providing a breakout for a fastener hole.

4. The instrument mounting panel for technical instruments as set forth in claim 1 further comprising fastener holes at the corner of each of said smaller panel elements.

* * * * *